United States Patent [19]

Bacher et al.

[11] Patent Number: 5,073,237
[45] Date of Patent: Dec. 17, 1991

[54] METHOD OF MAKING MOLDS FOR ELECTRODEPOSITION FORMING OF MICROSTRUCTURED BODIES

[75] Inventors: Walter Bacher, Stutensee; Hans Biedermann, Bruchsal; Michael Harmening, Stutensee, all of Fed. Rep. of Germany

[73] Assignee: Kernforschungszentrum Karlsruhe GmbH, Karlsruhe, Fed. Rep. of Germany

[21] Appl. No.: 672,421

[22] Filed: Mar. 20, 1991

[30] Foreign Application Priority Data

Apr. 3, 1990 [DE] Fed. Rep. of Germany ....... 4010669

[51] Int. Cl.$^5$ .................................. C25D 1/08
[52] U.S. Cl. ..................... 264/320; 205/112
[58] Field of Search ....................... 204/4, 11

[56] References Cited

U.S. PATENT DOCUMENTS 4,661,212  4/1987  Ehrfeld et al. ................. 204/11

OTHER PUBLICATIONS

H. Vollmer, W. Ehrfeld, P. Hagmann, "Fabrication of Microstructures with Extreme Structural Heights by Vacuum Reaction Injection Molding and Electroforming", May, 1987, Report kfk 4267, Kernforschungszentrum Karlsruhe, Germany, abstract.

Primary Examiner—T. M. Tufariello

[57] ABSTRACT

In a method of making molds with microstructured recesses having a continuous base covered by a film of an electrically conductive material for forming in the recesses, by electrodeposition, microstructured plate-like bodies a microstructure master mold is pressed into a layer of thermoplastic material coated with a film of an electrically conductive material at a temperature which is above the softening temperature of the thermoplastic material such that the thermoplastic material with the electrically conductive film thereon first contacts the microstructure face and then enters the recesses in the microstructure. The master mold and thermoplastic material are then cooled and the master mold is removed whereby the thermoplastic material provides a negative mold of the microstructure having a continuous electrically conductive film disposed on the recess bases whereas the remainder of the electrically conductive film is broken apart and disposed in isolated spangles on the rest of the microstructured mold. The microstructured negative mold is then ready for electrodeposition of a metal in the microstructure recesses using the electrically conductive film therein as an electrode.

10 Claims, 1 Drawing Sheet

METHOD OF MAKING MOLDS FOR ELECTRODEPOSITION FORMING OF MICROSTRUCTURED BODIES

BACKGROUND OF THE INVENTION

The invention relates to a method of producing negative molds with microstructured recesses for forming in said recesses, by electrodeposition, plate-like microstructured bodies.

Several procedures for making such negative molds are described in U.S. Pat. No. 4,661,212.

In one of the procedures described in this patent, a mold release agent is applied to the front face portions of a microstructured master mold which is then coated with a layer of an electrically conductive polymethylmetacrylate (PMMA)/carbon black mixture. The pretreated master mold is then pressed into a layer of a casting resin whereby the PMMA/carbon black mixture becomes firmly attached to the casting resin so that, after removal of the master mold, the layer of casting resin becomes a negative mold for the microstructure and carries in its recesses the electrically conductive PMMA/carbon black coat.

A disadvantage of this process is that only negative molds with relatively coarse microstructures can be generated in this manner.

In accordance with another procedure described in U.S. Pat. No. 4,661,212 a layer of an electrically insulating thermoplastic casting resin is disposed on top of a layer of an electrically conductive material layer. The master mold is then pressed into the casting resin layer until the front face areas of the microstructures contact the electrically conductive layer such that, after removal of the master mold, the electrically conductive layer is exposed at the bottom of the structure recesses of the negative mold.

This procedure however requires the thermoplastic casting resin layer to be of accurate and constant thickness. It is furthermore difficult to control impression of the master mold to a degree that all its front face areas are pressed into contact with the electrically conductive layer.

In another procedure disclosed in U.S. Pat. No. 4,661,212 an electrically insulating casting resin is applied to the master mold and the casting resin material on top of the microstructures on the mold is then scraped off with a wiper-type structure so that only the recessed areas of the microstructure remain filled with casting resin. After partial curing of the thermoplastic resin an electrically conductive layer of a PMMA-carbon black mixture is applied. After curing and removal from the mold, the so-provided negative mold has the electrically conductive material exposed at the bottom of the microstructure recesses thereof.

A disadvantage of this procedure is that two different material layers must be applied to the master mold and first partial and then full curing of the layers must be awaited.

The molding of microstructured bodies is extensively discussed by H. Vollmer, W. Ehrfeld and P. Hagmann in a publication entitled "Fabrication of Microstructures with Extreme Structural Heights by Vacuum Reaction Injection Molding and Electroforming", Kernforschungszentrum Karlsruhe, KfK 4267 (May 1987).

In this report a vacuum molding process is described wherein insulating microstructures of PMMA are molded on top of a metallic base plate in a reaction injection molding process. The metallic base plate must be supplied, that is, manufactured, separately and must be provided for each mold recess with a molding bore.

During the molding procedure the base plate is disposed on the master mold. The mold recesses are then evacuated by way of the molding bores and subsequently filled with a reaction resin material. The reaction resin is cured in the mold recesses and defines negative microstructures which, after hardening of the resin, are firmly attached to the base plate. The master mold is removed and the microstructure is released from the master mold by side-guided separating movement of the master mold and the base plate. During the following electroforming procedure the base plate serves as collector electrode.

This process however is relatively involved because of the large number of molding bores required.

It is the principal object of the present invention to provide a method of producing molds for platelike microstructures which avoids the disadvantages of the known methods. Removal of the master mold should be achievable in a single step. The method should make it further possible to produce negative molds with microstructure recess bases coated with various electrically conductive materials in a simple and efficient manner.

SUMMARY OF THE INVENTION

The method according to the invention accomplishes this object by pressing a microstructured master mold into a layer of thermoplastic material coated with a film of an electrically conductive material at a temperature which is above the softening temperature of the thermoplastic material such that the front face of the microstructure on the master mold first engages the conductive film which then ruptures as the thermoplastic material enters into the recesses in the microstructured master mold while the conductive film portion in contact with the microstructure front face remains intact. The master mold and thermoplastic material are then cooled and the master mold is removed providing for a negative mold of the microstructure of the master mold. The electrically conductive film from the front face of the master mold remains in the recess bases of the negative mold microstructure as a continuous structure whereas the remainder of the electrically conductive film is disposed on the rest of the microstructure mold surfaces in isolated spangles. The microstructured negative mold is then ready for electrodeposition of a metal in the microstructure recesses using the electrically conductive continuous film in the recess bases as an electrode.

To facilitate entering of the thermoplastic material into the recesses of the microstructured master mold the process is preferably performed under vacuum.

With the molding method according to the present invention a thermoplastic layer which is coated with an electrically conductive material is pressed with its coated side, preferably under vacuum, onto a master mold. As thermoplastic materials, those disclosed in U.S. Pat. No. 4,661,212 and in the earlier-identified report KfK 4267 may be utilized.

Before the molding procedure the thermoplastic material layer is coated with a thin film of an electrically conductive material such as gold, copper and silver and their alloys. Also carbon or carbon compounds may be utilized.

The coating should have a film thickness of about 50 to 500 nm, preferably about 100 to 300 nm. The coating may be applied by a sputtering process or by vapor deposition or by other suitable processes. It is advantageous if the surface of the thermoplastic material layer is roughened before it is coated with the electrically conductive material. The peak-to-valley height $R_t$ of the roughened surface is preferably 5 to 7 μm with an average value $R_a$ of 1 μm.

The surface may be roughened by a microsandblasting procedure.

During the molding process the master mold with its microstructures is pressed onto and through the coating of electrically conductive material into the layer of thermoplastic material.

To facilitate handling a grooved metal stamp of suitable size may be disposed on the free surface of the thermoplastic material layer and utilized to press the thermoplastic material layer onto the master mold. For this purpose the grooved surface is pressed onto the thermoplastic material such that the material firmly engages the master mold.

Pressing the master mold into the thermoplastic material layer is suitably done under vacuum, preferably under a pressure of 10 to 1 m bar and at a temperature above the softening temperature of the thermoplastic material. Which temperature is most suitable for the process depends of course on the type of thermoplastic material utilized. For non-cross-linked PMMA of medium molecular weight (100,000 to 150,000 g/Mol) temperatures of 145° to 160° C. have provided satisfactory results.

After impressing, the master mold and the thermoplastic material are cooled to a temperature below the softening temperature of the thermoplastic material. The cool-down temperature is preferably 30° to 60° C. lower than the softening temperature of the thermoplastic material. For PMMA a cool-down temperature of 50° C. is suitable.

The surface pressure applied between the master mold and the thermoplastic material layer is in the range of 50 KPa to 2.5 MPa if the thermoplastic material is PMMA and the temperature is in the given range.

During pressing of the master mold into the coated layer of thermoplastic material, the coating film ruptures at the microstructured areas of the master mold as the microstructures penetrate the thermoplastic layer.

After removal of the master mold, only isolated spangles of the film material remain on the front faces and on the side walls of the microstructures whereas on the bases of the microstructure recesses the film remains undisturbed. The continuous undisturbed electrically conductive film on the microstructure bases is utilized as an electrode in the subsequent electrodeposition step. The spangles of conductive film material remaining on the negative microstructure mold are insulated from the film in the microstructure bases because of their discrete arrangements and consequently do not disturb an accurate molding procedure by electrodeposition.

The roughening of the thermoplastic material layer before application of the electrically conductive film enhances formation of the isolated film spangles.

BRIEF DESCRIPTION OF THE DRAWINGS

The invention is explained on the basis of the attached figures and an example.

DESCRIPTION OF THE PREFERRED EMBODIMENT

Figure 1:
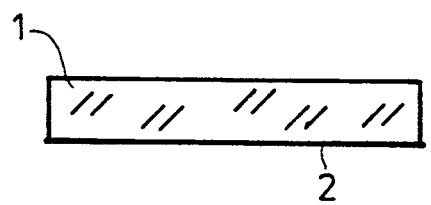
FIG. 1 shows a thermoplastic material layer.

A layer 1 of a thermoplastic material as shown in FIG. 1 is provided at one side thereof with a thin film 2 of an electrically conductive material.

Figure 2:
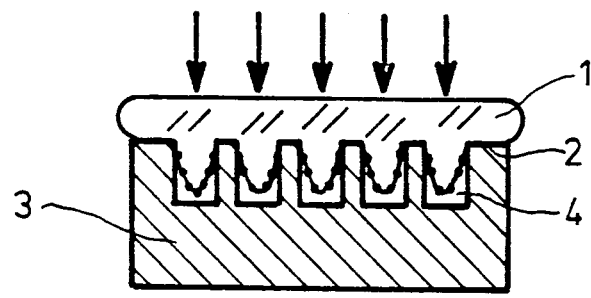
FIG. 2 represents the molding process.

As shown in FIG. 2 the thermoplastic material layer 1 is pressed with its side coated by the film 2 onto the master mold 3 which is provided with microstructure recesses 4. This molding process takes place under increased temperature and under vacuum. During this process the film of electrically conductive material first contacts the front faces of the microstructures and remains there undisturbed. As the thermoplastic material is forced into the microstructure recesses 4, the film ruptures and forms along the side walls of the microstructures a multitude of discrete spangles which are insulated from one another.

Figure 3:
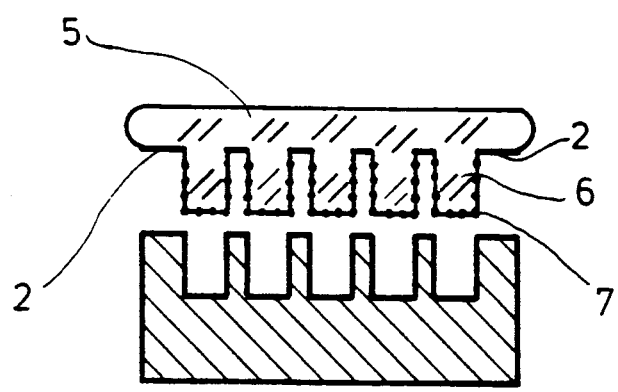
FIG. 3 shows the arrangement after removal of the master mold.

After hardening of the thermoplastic material and removal from the master mold as shown in FIG. 3, a negative mold 5 is obtained which has formed therein microstructures 6 provided, on the microstructure recess bases, with a continuous film of electrically conductive material for utilization as an electrode for electrodeposition build-up of the microstructure in the negative mold. The discrete spangles 7 of the electrically conductive film material on the side walls of the negative mold microstructure do not disturb the electrodeposition process.

The electrodeposition process to form a final microstructure on the negative mold may be performed in the same manner as disclosed, for example, in U.S. Pat. No. 4,661,212. The present invention however is not concerned with this procedure; it only is concerned with the method of efficiently producing the negative mold that permits the electrodeposition build-up of the microstructures.

EXAMPLE

The method according to the invention was utilized to make metallic honeycomb structures of nickel as follows:

The thermoplastic material layer (mold blank) was cast from a non-cross-linked polymethylmethacrylate resin consisting of:

100 w % Plexit 60 (30% PMMA, 70% MMA)
3 w % Pat 665 (internal parting compound)
4 w % Benzoyl peroxide (initiator)
2 w % Dimethylaniline (activator)

The components were mixed and degasified. The casting resin was subsequently cured in a casting structure for 1 hour at 40° C. and 10 MPa and then finally cured for another hour at 115° C. in order to reduce the remaining monomerous content of the reaction compounds. The surface of the so formed mold blank intended to be provided with the microstructure was then roughened by a micro-sandblasting device and a ca. 200 nm thick gold coating was sputtered onto the roughened surface.

The mold blank was then placed into a metal frame adapted to prevent the mold blank resin to escape during the microstructure forming step. Within the frame the mold blank was placed onto the master mold in a molding tool. The molding tool was then evacuated (1 m bar) and heated to a temperature of 150° C. in about 10 minutes. After reaching this temperature the molding tool was closed and a metal stamp was pressed with a surface pressure of 1 MPa onto the mold blank within the metal frame. After subjecting the mold blank to this pressure for about 5 minutes the tool was cooled down to 50° C. within 10 minutes. Since the metal stamp with which the thermoplastic resin was forced into the recesses of the microstructure was grooved at its underside, the thermoplastic material entered the grooves in the stamp and provided for firm engagement between the thermoplastic material and the stamp. After cooling of the casting resin down to mold removal temperature, the so-formed negative mold was removed from the master mold and its support structure.

In preparation for the electrodeposition procedure the negative mold was then encased and a contact pin was applied to the gold film on the base of the microstructure recesses for electrical contact therewith.

What is claimed is:

1. A method of making molds with microstructured recesses having a continuous base covered by a film of an electrically conductive material for forming in said recesses, by electrodeposition, microstructured plate-like bodies, said method comprising the steps of:
   a) coating a layer of a thermoplastic material with a film of an electrically conductive material,
   b) pressing a master mold with a microstructure formed thereon at a temperature which is above the softening temperature of the thermoplastic material through said film of electrically conductive material into said layer of thermoplastic material whereby the front face of said microstructure engages said electrically conductive film and presses a continuous portion thereof into said thermoplastic material layer while the remainder of said electrically conductive film breaks apart into a plurality of isolated spangles,
   c) cooling the master mold and thermoplastic material layer to a temperature below the softening point thereof, and
   d) removing the master mold thereby providing with said thermoplastic material layer a negative mold with microstructured recesses having said continuous electrically conductive film portion disposed on the base of said recesses.

2. A method according to claim 1, wherein the surface of said thermoplastic material layer is roughened before it is coated with said film of electrically conductive material.

3. A method according to claim 1, wherein said film of electrically conductive material includes carbon.

4. A method according to claim 1, wherein said film of electrically conductive material comprises a metal.

5. A method according to claim 4, wherein said metal is one of the group comprising gold, copper, and silver and alloys thereof.

6. A method according to claim 1, wherein said film of electrically conductive material has a thickness of 50 to 300 nm.

7. A method according to claim 1, wherein said film of electrically conductive material is deposited on said layer of thermoplastic material by sputtering.

8. A method according to claim 1, wherein said film of electrically conductive material is applied to said layer of thermoplastic material by vapor deposition.

9. A method according to claim 1, wherein said master mold is pressed into said layer of thermoplastic material under a vacuum of 10 to 0.1 m bar (absolute).

10. A method according to claim 9, wherein said master mold is pressed into said thermoplastic layer under a surface pressure of about 1 MPa.

* * * * *